United States Patent [19]

Liggat et al.

[11] Patent Number: 5,789,536
[45] Date of Patent: Aug. 4, 1998

[54] PROCESS OF POLYESTERS

[75] Inventors: John Jamieson Liggat, Rutherglen, United Kingdom; Gregory O'Brien, Portsmouth, R.I.

[73] Assignee: Monsanto Company, St. Louis, Mo.

[21] Appl. No.: 553,642

[22] PCT Filed: Jun. 1, 1994

[86] PCT No.: PCT/GB94/01181

§ 371 Date: Apr. 5, 1996

§ 102(e) Date: Apr. 5, 1996

[87] PCT Pub. No.: WO94/28047

PCT Pub. Date: Dec. 8, 1994

[30] Foreign Application Priority Data

Jun. 2, 1993 [GB] United Kingdom ............ 9311402

[51] Int. Cl.⁶ .................... C08F 6/00; C08J 5/00
[52] U.S. Cl. .................... 528/503; 528/481; 528/502; 264/176.1; 264/211.12; 264/319; 264/331.11; 264/346; 264/901; 264/904
[58] Field of Search .................... 528/481, 502, 528/503; 264/176.1, 211.12, 319, 331.11, 346, 901, 904

[56] References Cited

FOREIGN PATENT DOCUMENTS 2 160 208  12/1985  United Kingdom .
92/01548   2/1992   WIPO .
94/17121   8/1994   WIPO .

OTHER PUBLICATIONS

De Koning, et al: Ageing phenomena in bacterial poly [(R)–3–hydroxybutyrate], Polymer, vol. 33, No. 15, 1992, pp. 3295–3297.

Saiki, et al: "Stretching of poly (beta–hydroxybutyric acid) molding", Chemical Abstracts, vol. 105, No. 14, Oct. 6, 1986, abstract No. 116100 & JP,A,61 069 431, Apr. 10, 1986.

De Koning, et al: "Crystallization phenomena in bacterial poly[(R)–3–hydroxybutyrate]: 2. Embrittlement and rejuvenation", Polymer, nol 34, No. 19, 1993, pp. 4089–4094.

Primary Examiner—Samuel A. Acquah
Attorney, Agent, or Firm—Gary M. Bond; Arnold, White & Durkee

[57] ABSTRACT

Method of retarding age embrittlement of polyester comprising heat treating the polyester after preparation by cooling below 90° C. and then heating at 90° C. to 160° C. within 24 hours of preparation, and a polyester composition in which ageing is substantially retarded compared to the non-heat treated polyester. The invention encompasses the polyester composition which has been subjected to the method.

8 Claims, No Drawings

PROCESS OF POLYESTERS

This application claims benefit of international application PCT/GB94/01181, filed Jun. 1, 1994.

THIS INVENTION relates to processing of polyesters and in particular to producing shaped articles less liable to embrittlement.

It has been disclosed by de Koning et al in Polymer 92, 33, (15), 3295–3297 that whereas one such polyester poly (R)-3-hydroxybutyrate when freshly moulded shows ductile behaviour, within several weeks at room temperature the tensile modulus doubles and elongation at break drops below 10%. A typical feature of such ageing is that it can be partly reversed by heat or mechanical strain. Using mild 'deageing' treatment, the improvement in ductility is only small and temporary, but heating at above 100° C. restores the original mechanical properties and prevents or at least retards ageing to a large extent.

It has now been found that such age-embrittlement can be prevented or slowed by applying the heat treatment to shaped articles made substantially of polyhydroxybutyrate (PHB), polyhydroxybutyrate co-valerate (PHBV) and/or other polyhydroxyalkanoates before they have undergone significant ageing.

Thus according to the invention there is provided a polyester composition comprising polyhydroxyalkanoate (PHA) in which ageing of the polyester is retarded characterised in that after preparation the polyester is cooled to below 90° C. and then heat treated at 90° C. to 160° C. within 24 hours of preparation, and in that subsequent ageing is substantially retarded compared to the non-heat treated polyester.

In a further aspect of the invention there is provided a shaped article at least partly made of polyhydroxyalkanoate (PHA) in which ageing of the polyester is substantially retarded characterised in that after preparation the article is allowed to cool to below 90° C. is heat treated at 90° C. to 160° C. within 24 hours of preparation, and in that subsequent ageing is substantially retarded compared to the non-heat treated polyester.

"Ageing" means deterioration of the mechanical properties of polymer with time, for example, ductility and tensile strength. Loss of mechanical properties can be measured by measurements indicative of ageing, for example, elongation to break and impact resistance (Izod).

In the present context "substantially retarded" means that for practical purposes the polyester or article is not defective for brittleness or ductility for at least one month after the heat treatment. Preferably the polyester or article shows at least 40%, especially 60%, improvement in brittleness or ductility compared to the non-heat treated polyester or article. This can be measured using any measurement indicative of ageing, for example, by elongation to break measurements or impact strength measurements (Izod).

By "within 24 hours" is meant up to 24 hours, preferably within 12 hours of preparation, particularly 60 minutes or less from preparation.

"At least partly made" means having structural components made of PHA, for example PHB or PHBV, to such an extent that embrittlement of the PHA components embrittles the whole article. Thus for example articles having PHB components linked to other components, and articles made of a matrix of some other polymer with PHB inclusions, are within the invention. Articles made of PHB alone benefit most from the invention.

The heat treatment can be any that does not involve a step effecting substantial crystallisation of the polyester in the article presented to the heat treatment at 100° C. to 140° C.

If shaping has been by melting or sintering, the heat treatment may follow immediately upon shaping, for example by holding an article in its mould for a suitable time; the mould temperature may be deliberately adjusted or may be arrived at as the resultant of the molten polymer temperature and the initial mould temperature. If desired, the article may be held at a temperature appropriate for crystallisation before the heat treatment according to the invention. If shaping has been continuous, for example by extrusion of fibre or film or a profile, the heat treatment can be effected in a zone downstream of the extruder and any quench, crystallisation or draw zone.

The PHA is especially capable of a relatively high level of crystallinity, for example over 30%, especially 50–90%, in the absence of plasticiser. Suitably it is or includes at least one microbiologically produced polyester having units of formula I:

$$—O—C_mH_n—CO—  \qquad I$$

where m is in the range 1–13 and n is 2m or (if m is at least 2) 2m–2. Typically $C_mH_n$, contains 2–5 carbon atoms in the polymer chain and the remainder (if any) in a side chain. In very suitable polyesters m is 3 or 4, n is 2m and especially there are units with m=3 and m=4 copolymerised together and with respectively a $C_1$ and $C_2$ side chain on the carbon next to oxygen in the chain. Particular polyesters contain a preponderance of m=3 units, especially homopolymer (PHB) or with at least 70 mol %, preferably 70–98% of such units, the balance (if any) being units in which m=4 (PHBV). The molecular weight of the PHA is preferably over 50000, especially over 100000, up to eg $2\times10^6$.

The PHA is conveniently a blend of two or more polymers or copolymers differing in the value of m. A particular example contains (a) PHA consisting essentially of Formula I units in which 2–5 mol % of units have m=4, the rest m=3; and (b) PHA consisting essentially of Formula I units in which 5–30 mol % of units have m=4, the rest m=3.

In each such PHA there are side chains as above mentioned. The proportions in such a blend are preferably such as give an average m=4 content in the range 4–20 mol %.

In each such PHA having units with m=3 and/or m=4 there may be very small, typically fractional, percentages of units having higher values of m.

Typically the composition contains microbiologically produced PHA to the extent of over 50% w/w, especially over 80% w/w.

PHA comprising hydroxybutyrate units and hydroxyvalerate units includes PHBV copolymers containing up to 1 mol percent of other oxyalkanoate units whether introduced deliberately or not.

The polyhydroxyalkanoate is preferably polyhydroxybutyrate (PHB) or polyhydroxybutyrate-co-valerate (PHBV), which may be 3-hydroxy or 4-hydroxy or a mixture of both. Especially preferred are the (R)-3-hydroxy forms of PHB and PHBV.

The PHA is preferably a fermentation product, especially of a microbiological process in which a microorganism lays down PHA during normal growth or is caused to do so by cultivation in the absence of one or more nutrients necessary for cell multiplication. The microorganism may be wild or mutated or may have had the necessary genetic material introduced into it. Alternatively the necessary genetic material may be harboured by a eukaryote, to effect the microbiological process.

Examples of suitable microbiological processes are the following:

for Formula I material with m=3 or m=partly 3, partly 4: in EP-A-69497 (*Alcaligenes eutrophus*);

for Formula I material with m=3: U.S. Pat. No. 4,101,533 (*A. eutrophus* H-16), EP-A-144017 (*A. latus*);

for Formula I material with m=7–13: EP-A-0392687 (various Pseudomonas).

The PHA can be extracted from the fermentation product cells by means of an organic solvent, or the cellular protein material may be decomposed leaving microscopic granules of PHA. For specialised end uses the cellular protein may be partly or wholly allowed to remain with the PHA, but preferably subjected to cell breakage.

Alternately if the PHA can be a product of synthetic chemistry using processes known in the art. PHB can be prepared according to Bloembergen, S. and Holden, D. A., Macromolecules. 1989, Vol 22, p1656–1663). PHBV can be prepared according to Bloembergen, Holden, Bluhm, Hamer and Marchessault, Macromolecules. 1989, Vol 22, p1663–1669.

The properties of the polyester or article of the present invention can be assessed using the following measurements: stress-strain curve including calculations of elongation to break, Youngs modulus, and tensile strength; impact testing, for example Izod; and dynamic mechanical thermal analysis (DMTA). These are all standard methods for testing mechanical properties.

If the PHA contains m=3 units and then 1, especially more than 5, mol percent of units in which m=4 or greater than 6, the composition subjected to shaping preferably contains a plasticiser.

The polyester composition can contain the usual polymer processing additives such as plasticisers, particulate or fibrous or platy filler or reinforcer, fibres, nucleating agents (for example boron nitride, talc or ammonium chloride), and pigments. The nucleant is preferably present in 0.1 to 10 phr (parts per hundred), especially 1 to 5 phr. The composition can be in the form of mouldings, extrudates, coatings, films or fibres, including multilayer coatings, films or fibres.

The plasticiser is any material capable of plasticising polyester, i.e. capable of improving the ductility of the polyester and especially any material capable of plasticising PHB or PHBV. There may be one or more plasticisers present. For the ratio of plasticiser to PHA the range up to and including 40 phr w/w, preferably 1 to 40 phr w/w includes most of the likely uses and for making effectively rigid but not brittle articles the range 5–20 especially 6–12, phr w/w is generally suitable.

Examples of suitable plasticisers are (a) high-boiling esters of polybasic acids, such as phthalates, isophthalates, citrates, fumarates, glutamate, phosphates or phosphites. The esterified radicals may be for example $C_1$–$C_{12}$ alkyl, aryl, aralkyl or aralkyl. Particular examples are dioctyl-, dibeptyl- and dirindecyl- phthalates and dialkylalkylene oxide glutamate (Plasthall 7050);

(b) high boiling esters and part- of polyhydric alcohols, especially glycols, polyglycols and glycerol. The acid-derived radical of the ester typically contains 2–10 carbon atoms. Examples are triacetin, diacetin and glyceryl dibenzoate;

(c) aromatic sulphonamides such as paratoluene sulphonamide.

A particularly preferred plasticiser is a doubly esterified hydroxycarboxylic acid having at least 3 ester groups in its molecule.

"Doubly esterified" means that at least some of the hydroxy groups of the hydroxycarboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups.

The groups with which the carboxy groups are esterified contain preferably 1–7, especially 2–5 carbon atoms. In the ester molecule they can be the same or different. Preferably they are aliphatic. For thermal stability but biodegradability such aliphatic groups preferably have straight chains. If desired, a small portion of these groups are divalent, so as to give an oligomer suitably containing up to 3 repeating units.

The groups with which the hydroxy groups are esterified preferably contain 2–7, especially up to 4, carbon atoms, including the carbon atom of the carboxy of such groups. In the ester molecule such groups can be the same or different. Preferably they are aliphatic and, for thermal stability and biodegradability, have straight chains. If desired, a small proportion of these groups are divalent, so as to give an oligomer suitably containing up to 3 repeating units. An example of such a plasticiser is Estaflex*ATC.*indicates a tradename or registered trademark.

This list is not exhaustive and any plasticiser of polyester which is not listed above or which becomes available after the date of this application would be suitable for use in this invention.

The process used to shape the article can be for example any one of injection moulding, compression moulding, extrusion of fibre or films, extrusion of profile, gas-current spinning, tack spinning, coating melt onto substrate, coating latex onto substrate, shaping solution in volatile solvent.

The invention also provides a method of retarding age embrittlement of polyester comprising heat treating said polyester characterised in that after preparation the polyester is cooled to below 90° C. and then heat treated at 90° C. to 160° C. within 24 hours of preparation.

The heat treatment is more preferably in the range 90° to 150° C., especially 100° C. to 140° C.

The heating time is typically at least a few seconds, preferably from 5 seconds to 20 hours, especially 0.5 minutes to 14 hours, particularly 0.5 minutes to 2 hours.

The heating time required for optimal effect is dependent on the heating temperature, i.e. the higher the temperature the less time that is required to achieve optimal effect. Also the temperature can be chosen to suit the characteristics of the processing plant and economic requirements.

Heating can be effected in air or oxygen-depleted or inert gas or in vacuo, or in water or a fluid which does not interfere with the integrity of the polyester, or in a mould. Heat transfer can be by conduction, radiation, convection or resistive heating. Heat transfer methods may include ovens, water baths and hot rollers. A preferred form of heat transfer is by infra red radiation, for example, black body and quartz tubes. The shaped article is generally subjected to infra red radiation for 30 seconds to 15 minutes, preferably 30 seconds to 10 minutes.

The shaped articles may be run through the oven or other heating method on a continuous belt at a speed which is optimal to enable the shaped article to reach the correct temperature. A preferred method is to have a multi-zone system, preferably a 2 zone heat system in which the first zone gives a rapid rate of heating (i.e. the actual temperature in the zone may higher than that to be achieved by the shaped article) to bring it to the actual temperature required and then in the second zone the shaped article is maintained at the actual temperature to be achieved for the desired time period.

The invention provides methods of making the composition by mixing its components. If desired, this may be effected in a solvent, such as a halogenated hydrocarbon or alkylene carbonate. Such a method is convenient for coating or for centrifugal spinning of fibres. More conveniently, if a plasticiser is present, the plasticiser is mixed with powdered dry polymer and the mixture is treated in conditions of shear, such as in a plastic mill or extruder. The product is then granulated and used as feed for a shaping operation such as extrusion, injection moulding, injection blow-moulding or compression moulding.

The composition is especially useful for making the following shaped articles: films, especially for packaging, fibres, non-woven fabrics, extruded nets, personal hygiene products, bottles and drinking vessels, agricultural and horticultural films and vessels, ostomy bags, coated products (such as paper, paperboard, non-woven fabrics), agricultural and horticultural films and vessels, slow-release devices. Alternatively, the polymer composition with suitable additives can be used as an adhesive.

The invention is now further described, but is not limited by, the following examples.

FORMULATION AND TEST PROCEDURES

In the following examples, the PHB and PHBV polymers were the [R]-3-hydroxy form. Compositions were prepared by mixing copolymer (500 g) with 1 phr boron nitride and (if required) plasticiser, and extruding the mixture in a Betol 2520 extruder in these conditions:

| | |
|---|---|
| Zone 1 | 130° C. |
| Zone 2 | 140° C. |
| Zone 3 | 150° C. |
| Die | 150° C. |
| Screw Speed | 100 rpm |

The extrudate, a single 4 mm lace, was crystallised at 50°–60° C. in a water bath, dried in a current of air and cut into granules.

Granules were then injection moulded (Boy 15 S) into hot moulds, to give dumbbell-shaped tensile bars according to ISO R 537/2, their prismatic part measuring 40×5×2 mm. The mould temperature was held at 60° C. after entry of the polymer. The bars were numbered as they came out of the mould, then allowed to cool at ambient temperature. Injection moulding conditions were:

| | |
|---|---|
| Barrel Zone 1 | 130° C. |
| Barrel Zone 2 | 130° C. |
| Nozzle | 130° C. |
| Mould heater temperature | 74–77° C. |
| Mould temperature | 60° C. |
| Pressure hold on time | 12 sec |
| Cooling time | 30 sec |
| Injection pressure | 45 bar |
| Screw Feed | 250 rpm |

After removal from the mould the bars were stored for various periods at ambient temperature and then subjected to tensile testing using an Instrom 1122 fitted with a Nene data analysis system. The jaw separation used was 50 mm and crosshead speed was 10 mm/min$^{-1}$.

EXAMPLE 1

The composition PHB 10 V and 1 phr boron nitride+10 phr dioctylphthalate (Jayflex DIOP) (RTM) was prepared and moulded as described. The bars were removed from the mould. The bars were then heat treated at 110° C. for 1 hour. The bars were tested for elongation to break over various periods. The lower the elongation to break the less ductile the polymer. Results are shown in Table 1 as percentage elongation to break.

TABLE 1

| | Ageing time after heat treatment(days) | | | | |
|---|---|---|---|---|---|
| | 0 | 1 | 3 | 7 | 28 |
| Control | 459.3 | 15.3 | — | 13.8 | 12.8 |
| treated | 282.5 | — | 44.8 | 30.6 | 29.0 |

(—) means not tested.

It is evident that for the heat treated polymer the extension to break, although initially considerably less than for the non-heat treated polymer, decreases less rapidly over a period of time to a level significantly (over 100%) and usefully higher than that of the untreated polymer.

EXAMPLE 2

The experiment of Example 1 was repeated using plasticised homopolymer (1 phr BN as nucleant and 20 phr Diolpate PPA 350 as plasticiser).

The bars were released directly after moulding. Within 30 seconds of de moulding the bars were heat treated at 110° C. for 1 minute. The bars were tested for extension to break and the values are represented as percentage extension to break.

TABLE 2

| | Ageing time after treatment (days) | | | | | |
|---|---|---|---|---|---|---|
| | 0 | 1 | 7 | 28 | 84 | 185 |
| Control | 619 | 340 | 21.2 | 17.4 | 14.9 | 11.95 |
| treated | 540 | 427 | 103 | 34.9 | 25.8 | 21.9 |

It is evident that the extension to break for the heat treated polymer, although starting from a lower value, does not decrease as rapidly as the non-heat treated polymer and is still significantly higher (approximately 100%) than the corresponding value for the non-heat treated polymer at 6 months after treatment.

EXAMPLE 3

The experiment of Example 1 was repeated using plasticised homopolymer (1 phr BN as nucleant and 20 phr Reoplas 39 as plasticiser).

The bars were released directly after moulding. Within 30 minutes after moulding the bars were heat treated at 140° C. for 30 minutes. The bars were tested for extension to break and the values are represented as percentage extension to break.

TABLE 3

| | Ageing time after heat treatment(days) | | | | |
|---|---|---|---|---|---|
| | 0 | 1 | 3 | 7 | 28 |
| Control | 55.2 | 20.5 | 10.5 | 7.4 | 6.3 |
| Treated | 49.7 | 42 | 42.9 | 30.2 | — |

These results also demonstrate that at 28 days after treatment the heat treated polymer is significantly more ductile than the non-heat treated polymer.

We claim:

1. In a process of producing a shaped article at least partly made of a polyhydroxyalkanoate selected from the group consisting of poly-(R)-3-hydroxybutyrate and poly-(R)-3-hydroxybutyrate-co-(R)-valerate by the steps of:

(a) shaping by injection molding, compression molding, melting, sintering, extrusion of fiber or film or profile, gas-current spinning, tack spinning, coating of melt onto substrate, coating latex onto substrate, or shaping solution in volatile solvent;

(b) allowing the shaped article to cool below 90 deg C.; and (c) heat treating at 90–160 deg C. without substantial change of shape; the improvement wherein step (c) is performed within 24 hours of the end of step (a), whereby the resulting shaped article is characterized by its resistance to brittleness on aging.

2. Process according to claim 1 in which the PHA contains plasticiser.

3. Process according to claim 1 in which the temperature of step (c) is in the range 100°–140° C.

4. Process according to claim 1 in which the PHA contains 4–20 mol % of valerate.

5. Process according to claim 1 in which step (c) takes 5 sec to 20 h.

6. Process according to claim 1 in which steps (a), (b) and (c) are carried out in immediate succession, the articles formed in step (a) being run through heating zones on a continuous belt and heat being supplied to step (c) by infra red radiation for a period in the range 30 seconds to 15 minutes.

7. A shaped article made by the process of claim 1 and being at least partly made of poly-(R)-3-hydroxybutyrate-co-(R)-valerate copolymer containing 70–98 mol % of such butyrate units, characterised by not being defective for brittleness for at least one month after being formed.

8. In a process of producing a shaped article at least partly made of poly-(R)-3-hydroxybutyrate-co-(R)-valerate by the steps of:

(a) shaping by injection molding, compression molding, melting, sintering, extrusion of fibre or film or profile, gas-current spinning, tack spinning, coating of melt onto substrate, coating latex onto substrate, or shaping solution in volatile solvent;

(b) allowing to cool below 90° C.; and (c) heat treating at 90°–160° C. without substantial change of shape; the improvement which comprises performing step (c) within 24 hours of the end of step (a) whereby the resulting shaped article is characterised by its resistance to brittleness on ageing.

* * * * *